United States Patent [19]
Carroll

[11] Patent Number: 4,721,565
[45] Date of Patent: Jan. 26, 1988

[54] APPARATUS FOR HANDLING MIXTURES

[76] Inventor: Noel Carroll, Sherbrooke Road, Sherbrooke, Victoria, Australia

[21] Appl. No.: 903,564
[22] PCT Filed: Dec. 20, 1985
[86] PCT No.: PCT/AU85/00322
§ 371 Date: Aug. 12, 1986
§ 102(e) Date: Aug. 12, 1986
[87] PCT Pub. No.: WO86/03696
PCT Pub. Date: Jul. 3, 1986

[30] Foreign Application Priority Data
Dec. 20, 1984 [AU] Australia ............................. PG8657
Feb. 7, 1985 [AU] Australia ............................. PG9192

[51] Int. Cl.$^4$ .......................................... B01D 17/038
[52] U.S. Cl. .................................... 210/251; 166/68; 166/105.1; 166/267; 209/144; 209/211; 210/512.1; 210/512.2

[58] Field of Search ................. 210/512.1, 512.2, 251, 210/541, 542; 209/144, 211; 166/68, 267, 105.1; 366/341, 348, 349, 320, 325-330

[56] References Cited

U.S. PATENT DOCUMENTS

| 1,437,721 | 12/1922 | Clark | 166/267 |
| 2,229,541 | 1/1941 | Zublin | 166/105.1 |

FOREIGN PATENT DOCUMENTS 831357 9/1938 France.
1178001 5/1959 France.

*Primary Examiner*—Frank Sever
*Attorney, Agent, or Firm*—Ladas & Parry

[57] ABSTRACT

The instant invention provides structure for removing "globs" of oil from water from a feed withdrawn from subsurface deposits. The "globs" are homogenized into the feed with a static mixer. The oil is subsequentially removed by conventional liquid separation means.

6 Claims, 6 Drawing Figures

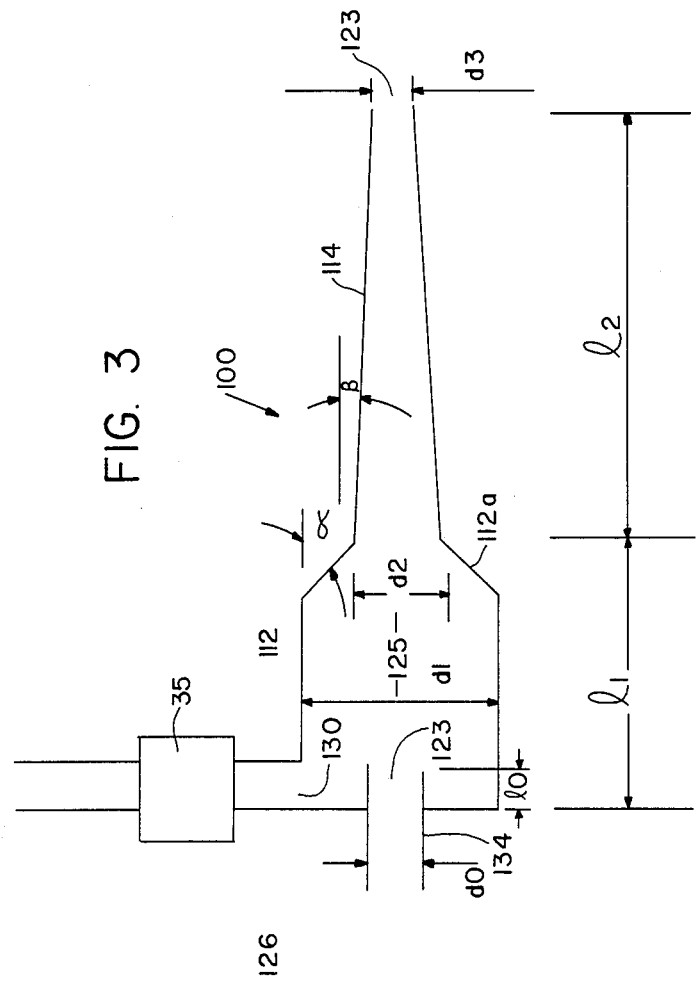

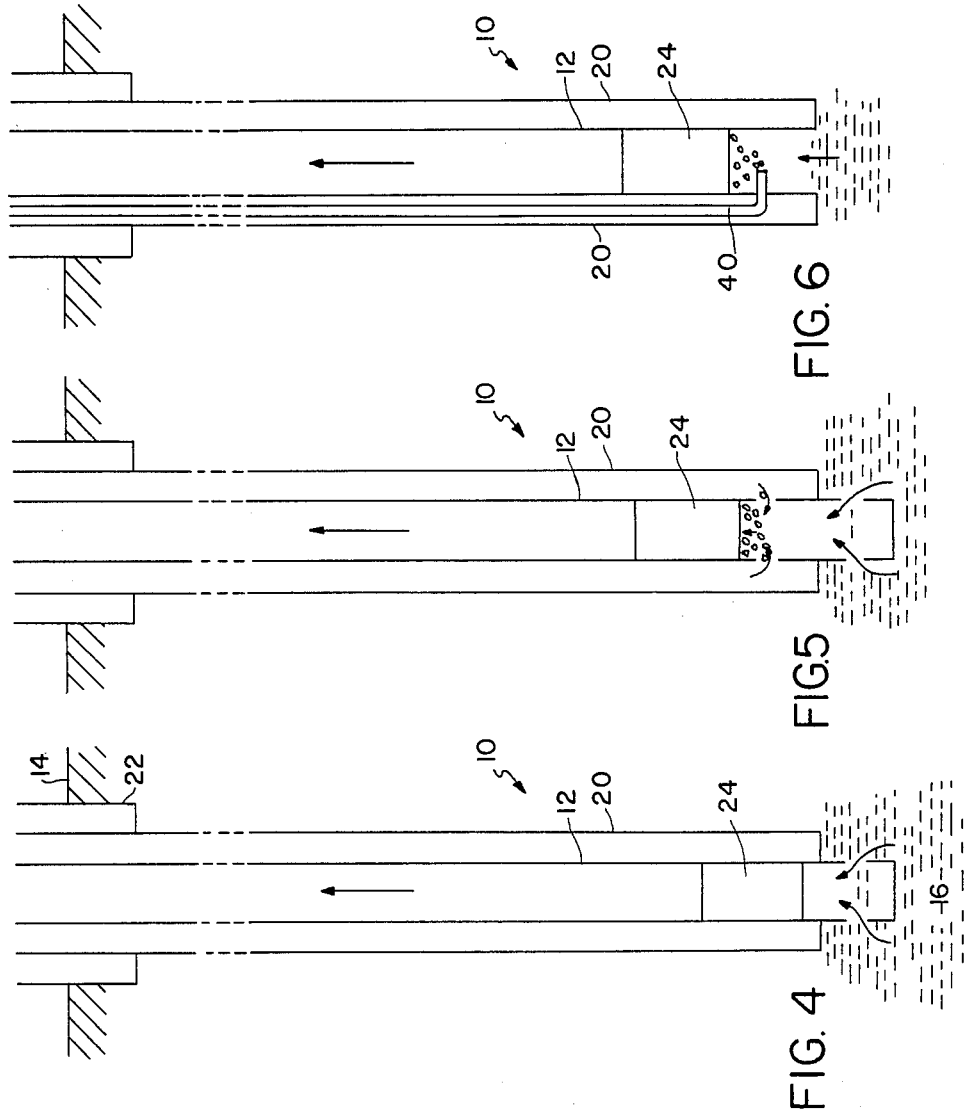

APPARATUS FOR HANDLING MIXTURES

This invention relates generally to apparatus for handling mixtures which include at least two liquid components although it will be appreciated that the mixture could also include gaseous and/or solid components.

In one preferred aspect, the invention relates to cyclone separator apparatus for separating liquid components from a liquid mixture. In another preferred aspect, the invention relates to apparatus for use in the recovery of sub-surface oil.

Generally, the oil from a well which passes upwardly from the oil deposit through the oil flow path defining structure between the deposit and the surface, referred to as a "sub-surface completion" comprises a duct or line which is formed of strings of casings each of elongate tubular form. The oil which passes through the sub-surface completion may be formed in various admixtures, for example, water and gas, the gas in particular tending to emerge from solution as the oil passing through the sub-surface completion becomes subjected to lessening pressure as it rises to the surface. Even at the lower end of the completion, at the lower end of the so-called "production casing", the oil water and gases may be present in bubbles or "globs" of relatively discrete components. The presence of these discrete components in only gross admixture may cause certain operating difficulties. For example, where it is desired subsequently to effect separation of oil and water components by use of a cyclone separator, the proper operation of the cyclone separator may be inhibited by quickly occurring variations in the physical form of the liquid as it is admitted to the separator. Thus, if the separator were designed to function adequately for a given gross ratio of water to oil, operation will not be satisfactory if the flow contains "globs" of oil. Furthermore, where the so-called "air lift" method is employed to facilitate movement of the oil to the surface the presence of these discrete "globs" of relatively more water free oil or of gas bubbles in the flow may present difficulties. Finally, it may be desirable to admix demulsifier into the material pumped from the well in order to facilitate subsequent separation, such as when using a cyclone separator for that purpose.

An object of the invention in relation to one preferred aspect is to provide a method and apparatus which, at least in part avoids one or more of the above difficulties.

An object of another preferred aspect of the invention is to improve the efficiency of separation of components of a liquid mixture.

According to one aspect of the present invention there is provided apparatus for handling mixtures which include at least two liquid components comprising a cyclone separator having an elongate separating chamber with a larger cross-sectional dimension end and a smaller cross-sectional dimension end, said separating chamber having at least one feed inlet arranged at or towards the larger end thereof, and first outlet means and second outlet means, said separator being in combination with a mixer device operatively connected to the separator and in the flow path of the mixture to be admitted to the separating chamber through said feed inlet, said mixing device being effective to homogenously mix the components of the mixture passing therethrough and before admission to the separating chamber.

Preferably, the mixer is a static mixer and may comprise a plurality of fixed baffles arranged to agitate and admix the liquid components. There may be further provided means for delivering one or more fluid modification agents such as emulsifying agents to said mixer.

According to another aspect of the present invention there is provided apparatus for handling oil mixtures to be recovered from underground reservoirs, the apparatus including a duct or line disposed in a cavity between the reservoir and a surface thereabove and at least one mixer which is operatively connected to said duct or line effective to homogenously mix at least the liquid components in the liquid mixture which, in use, is delivered from the reservoir to the surface. Preferably, the mixer is a static mixer.

According to yet another aspect of the present invention there is provided apparatus for handling mixtures containing oil and other constituents, the apparatus comprising a primary treatment section which includes one or more primary cyclone separators each having inlet feed means and first and second outlet means said primary cyclone separator(s) being of the type capable of handling a mixture containing a relatively high percentage of oil and of separating the mixture into first and second components which are discharged from said first and second outlet means respectively with said first component being relatively highly concentrated in oil and said second component being of relatively low concentration, the apparatus further including a secondary treatment section which includes one or more secondary cyclone separators the or each separator including means operatively connected to said second outlet means of said primary cyclone separator(s) said secondary cyclone separators further including first and second outlet means and being of the type capable of handling mixtures containing a relatively low percentage of oil and of separating the mixture received from said second outlet means of said primary cyclone separators into first and second components which discharge from said first and second outlet means of said secondary cyclone separators respectively, said first component containing substantially the remainder of the oil and said second component being substantially oil free, said apparatus further including one or more mixers either connected to the inlet of the or each of the separators of said primary treatment section and/or operatively connected to the line interconnecting the separator(s) of the primary treatment section and those of the secondary treatment section.

The invention is particularly, but not exclusively, applicable where "gas lift" is employed to facilitate transport of the liquid mixture to the ground surface, such as by introduction of gas into the liquid mixture at a location along the length of the sub-surface completion. The invention is also applicable where the sub-surface completion includes means for admitting a demulsifying agent into the sub-surface completion.

The invention is particularly applicable where the mixture to be separated is an oil water mixture and may be employed where the mixture is predominantly water or where it is predominantly oil and, particularly may be employed where the cyclone separator is of a kind specifically designed for separation of mixtures of either type.

Example embodiments of the invention are further described with reference to the accompanying drawings in which:

FIG. 3 is a diagrammatic view of a further cyclone separator apparatus constructed in accordance with the invention; and FIGS. 4, 5 and 6 are diagrammatic views of three forms of the invention.

Figure 1:
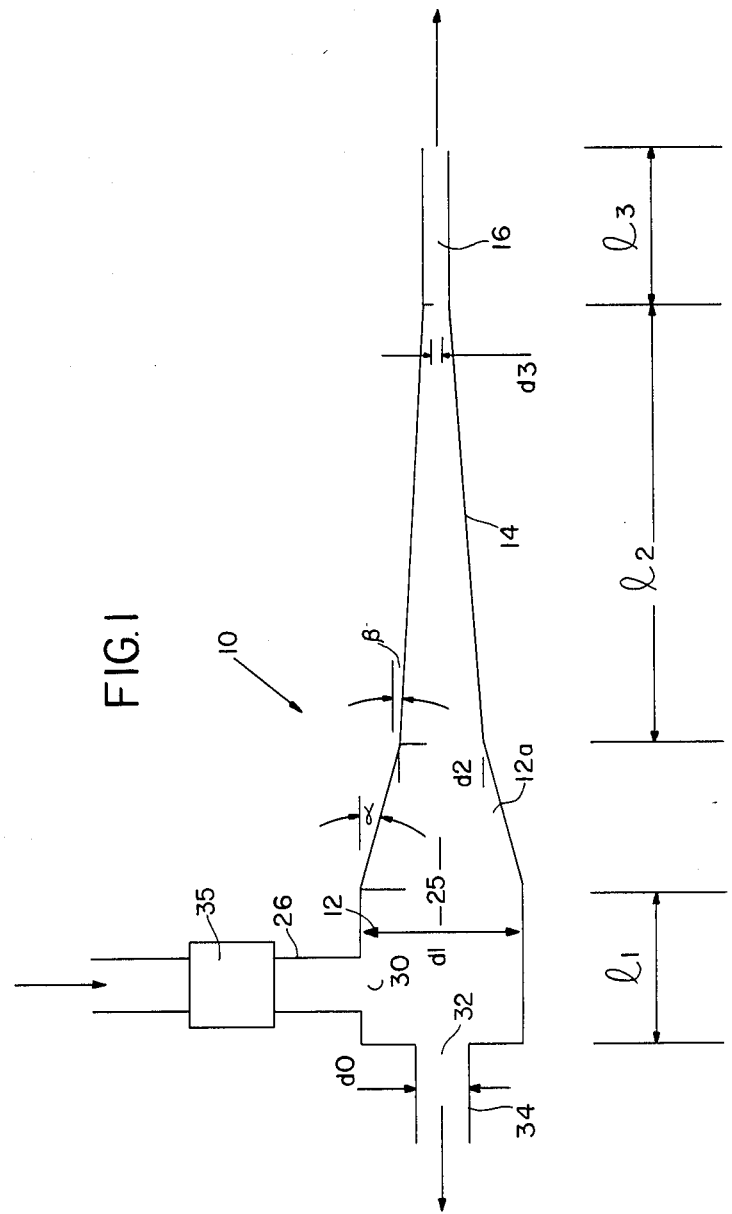
FIG. 1 is a diagram of a cyclone separator apparatus constructed in accordance with the invention.

In FIG. 1, a cyclone separator 10 is shown as having a separating chamber 25 having first, second and third cylindrical portions 12, 14 and 16 coaxially arranged in that order. These cylindrical portions are generally similar to the corresponding first, second and third cylindrical portions of the separating chamber of the cyclone separator described in U.S. Pat. No. 4,237,006, the disclosures of which are hereby incorporated into the present specification to form part thereof. The first cylindrical portion 12 has a feed pipe 26 associated therewith, this being arranged to feed tangentially into the cylindrical portion 12 an inlet aperture 30 is positioned close to the end of portion 12 remote from portion 14. The end of portion 12 remote from portion 14 also has a circular first or overflow outlet 32 which leads to an overflow outlet pipe 34.

A tapered part 12a of the separating chamber is positioned between the first and second cylindrical portions 12, 14, towards the second cylindrical portion 14, although such tapered section is not essential.

The second cylindrical portion 14 exhibits a taper over its length, tapering from a diameter at the end adjacent part 12a equal to the diameter of part 12a at the junction between the two portions to a somewhat lesser dimension at its opposite end. Cylindrical portion 16 is of constant diameter equal to the minimum diameter of portion 14.

In the FIG. 1, the length $l_1$ of portion 12, its diameter $d_1$, the taper angle $\alpha$ of the tapered part 12a, the internal diameter $d_o$ of the outlet pipe 34, the length and diameter $l_2$, $d_2$ of the second portion 14, the taper angle $\beta$ of the second portion 14 and the length $l_3$ and diameter $d_3$ of the third cylindrical portion, as well as the total area $A_i$ of the two feed inlet apertures 30 may all be selected as follows, in accordance with parameters mentioned in U.S. Pat. No. 4,237,006:

$10 \leq l_2/d_2 25$ $0.04 \leq 4A_i/\pi d_1^2 \leq 0.10$ $0.1 \leq d_o/d_2 \leq 0.25$ $d_1 > d_2$ $d_2 > d_3$ However, not all these parameters need necessarily be so constrained. For example the outlet diameter $d_o$ need not constrained to the above limits as described therein. Generally, though it is in any event preferred that the length $l_2$ be at least ten times diameter $d_2$.

As described in the specification of International Patent Application No. PCT/AU83/00028, a portion (not shown) may be added to the separating chamber 25. In this instance however, the portion 16 terminates in an underflow outlet 23.

In use, liquid to be separated is admitted tangentially to the interior of cylindrical portion 12 via feed pipes 26, the more dense component of the liquid then travelling lengthwise through the separator to emerge from outlet 23, whilst the less dense component emerges from pipe 34 via outlet 32.

The separator above described is particularly useful for separating oil and water components in an oily water mixture, more particularly where there is only a relatively small portion of oil present in the mixture as applied to the separator. In this instance, then, the lighter oil emerges from the pipe 34 and the relatively more dense water emerges from the underflow outlet 23.

In order, in accordance with this invention, to improve the efficiency of separation, the cyclone separator 10 has, fitted to inlet pipe 26, a static mixer 35. This mixer is effective in use to homogenously mix the oil and water components as they enter the separating chamber 25 and has been found to result in facilitated separation of components of the admitted mixture, more particularly to reduce the possibility of contamination of the water outlet from the overflow outlet 23 with oil.

FIG. 3 shows a mixer 35 associated with a further type of cyclone separator in accordance with this invention. This separator 100 has a separating chamber 125 of generally tapered form having a first portion 112 of cylindrical form which includes at one end an axial overflow outlet pipe 134 which extends into the portion 112 a short distance and defines an overflow outlet 132. Portion 112 also has a tangential feed inlet 126. At the end remote from outlet pipe 134, the portion 112 includes a tapered portion 112a which joins with a second portion 114 of the separator chamber, portion 114 being tapered and leading to an underflow outlet 123 axially positioned at the end of the separating chamber 25 remote from outlet 132.

This separator is designed for separation of oil and water components of a crude oil mixture as pumped from the ground. This mixture contains substantial quantities of water and gas is intended to separate the mixture into oil and gas streams which emerge from the overflow outlet pipe 134 and oily water and gas streams which emerge from the underflow outlet 123. The separator 100 is of a kind particularly described in the specification of my co-pending patent application PG 8334 the contents of which are hereby incorporated into the present specification to form part thereof. As described in the last mentioned specification the separator 100 may be proportioned as follows:

$0.1 d_2 \leq d_3 \leq 0.5 d_2$ $0.15 d_2 \leq d_0 \leq 0.5 d_2$ $d_2 \leq l_1 \leq 4 d_2$ $30° \leq \alpha \leq 60°$ $0.8 d_2 \leq l_0 \leq 0.8 d_2$ $5 d_2 \leq (l_1 + l_2) \leq 20 d_2$ $A = (\pi d_2^2 / 32n)$ $1\frac{1}{2}° \leq \beta \leq 4\frac{1}{2}°$ where $d_1$ is the diameter of the separator portion 112 at its greatest diameter end, $d_2$ is the diameter of the separator portion 114 at its greater diameter end, $d_3$ is the diameter of the underflow outlet 123, $d_0$ is the diameter of the overflow outlet pipe 134, $l_1$ is the length of the portion 112 including portion 112a, $l_2$ is the length of portion 114, $\alpha$ is the half angle or conicity angle of the tapered portion 112a and $\beta$ is the half angle or conicity angle of the tapered portion 114. "A" is the total cross sectional area of the feed inlet 130 defined where the pipe 126 breaks into the portion 112 of the separating chamber or, if there are "n" such inlets with "n" corresponding inlet pipes 126, the total area of such inlets. In this instance, too, static mixer 35 is shown coupled to the inlet pipe 126.

The instances where there are more than one inlet 26 or 126 there may be a mixer 35 associated with each such inlet or they be supplied from a branched inlet pipe into which a single mixer 35 is incorporated.

Figure 2:
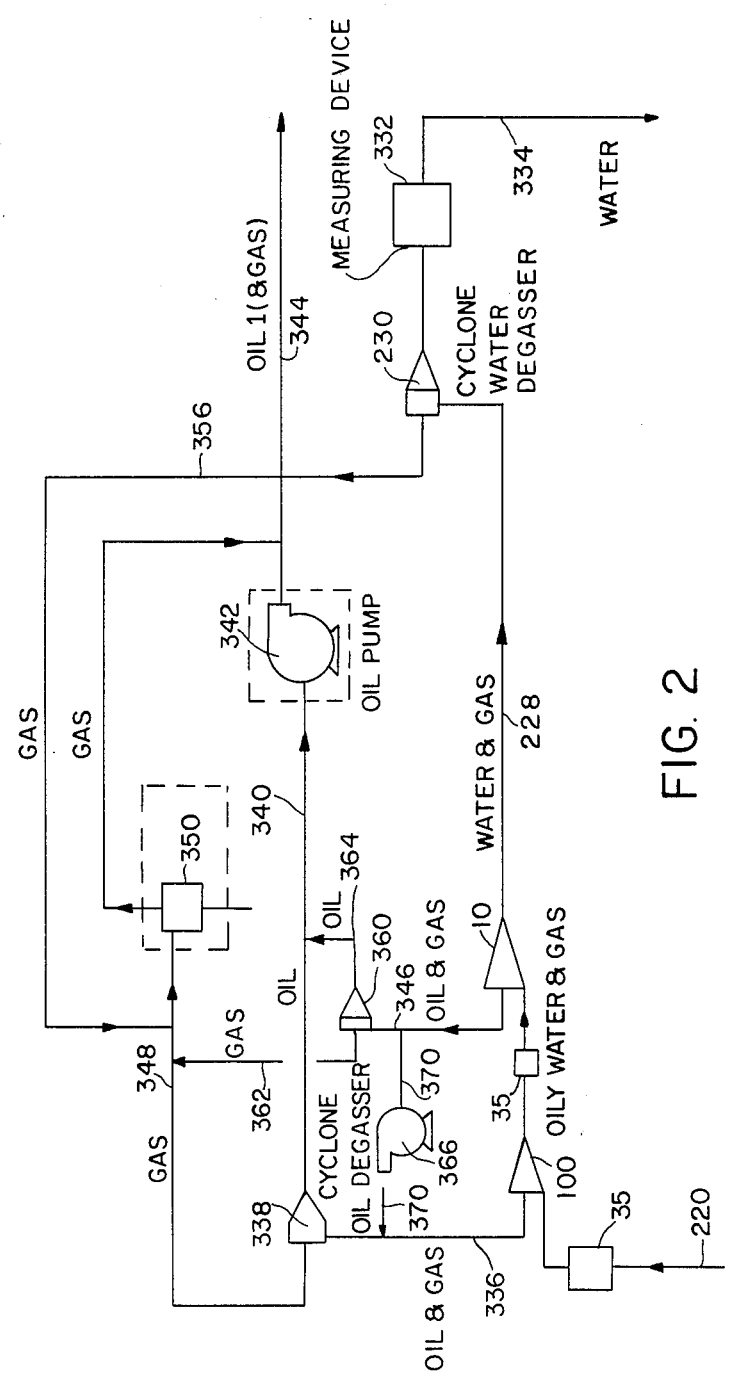
FIG. 2 is a diagram of an oil processing apparatus using separating apparatus constructed in accordance with the invention.

The invention is particularly applicable in oil processing apparatus employing cyclone separators, such as described the specification of my co-pending international application PCT/AU85/00293. FIG. 2 shows such an arrangement. Here oil in a line 220 from the well head is passed to hydrocyclone 100, effective for water dispersed in oil. A line 224 therefrom at the underflow outlet end carries oily water and gas to the inlet of a second hydrocyclone 10 for oil dispersed in water. The underflow outlet of this separator 10 is passed on a line 228 to a cyclone water degasser 230 thence through an oil content measuring device 332 to a clean water outlet 334. Oil and gas taken from the overflow outlet of the separator 100 passes on a line 336 to the inlet of a cyclone oil degasser 338. Oil from the underflow outlet of degasser 338 is taken on a line 340 through a pump 342 to an oil outlet line 344. The overflow outlet of degasser 338 is connected to a line 348 which carries gas from the degasser 338 through a gas compressor 350 to pass the gas via a line 352 to the line 344 so that gas is also carried on the line 344. The gas from the overflow outlet from the degasser 230 is taken on a line 356 and added to line 348.

The overflow outlet of the separator 10 is passed to a separator 360 of cyclone type, the overflow outlet of which carries gas, on a line 362, for admixture with gas in line 348. Oil from the underflow outlet of separator 360 is carried on a line 364 and is connected to line 340 for admixture of such oil into the oil carried by line 340. A pump 366 is provided in a line 370. Line 370 connects to line 336 and the line 346 from the overflow outlet of separator 10 to separator 360. Pump 366 pumps oil and gas from line 346 to return it to line 336.

In accordance with this invention, static mixers 35 are positioned respectively in lines 220 and the line interconnecting the underflow outlet of separator 100 with the inlet of separator 10.

Static mixers useful in the invention include mixers of the kind in which fixed baffles are provided in order to agitate and admix the liquid components homogenously, preferably without introducing emulification. However, kinetic mixers employing movable such as rotatable elements may be employed.

Although the use of static mixers, in accordance with the invention, has been described, by way of example, in the context of their use with particular types of cyclone separator, they may be employed with other forms of cyclone separator.

The static mixer may be used in conjunction with cyclone separators where admission of suitable demulsifying agents is made to the liquid mixture being inletted into the separator, for purposes of improving separating efficiency. In this case the static mixer facilitates the admixture of the demulsifying agent. Also, in cases where it is desired to effect oil enrichment to a cyclone separator by recovery of an enriched oil component recovery may be facilitated by including means for metering quantities of oil into the mixture to be separated prior to admission to the cyclone separator. In this case, the separating efficiency or enrichment efficiency of the separating apparatus is improved by passing the inlet mixture through a mixer in accordance with this invention. Furthermore, where it is desired to generally enrich an oil containing liquid by addition of further oil, the mixing efficiency may be improved by use of a mixer in accordance with this invention.

In FIG. 4 a sub-surface completion 10 is shown having an inner or "production" casing 12 which extends from a ground surface 14 to the oil deposit 16, as well as an outer intermediate casing 20 which may, as shown, be encased at its upper end by a still further casing 22. As usual, oil flows from the deposit 16 into the production casing 12 to flow to the surface. In accordance with this invention, however, there is provided a location adjacent the lower end of the casing 12 a static mixer 24 effective to homogenously mix liquid and gas components in the liquid pumped from the deposit 16 through the completion 10.

FIG. 5 shows a modification of the arrangement in FIG. 4 where the so-called air lift principle is employed. Here, air is admitted to the annular space between the production casing 12 and the intermediate casing 20 from whence it flows into the production casing 12 at the bottom thereof, being admitted as bubbles which, by lightening the effective density of the liquid, serve to facilitate pumping to the surface.

In FIG. 6 the static mixer 24 is positioned in the production casing immediately below a location at which a suitable demulsifying agent is admitted thereinto via a duct 40. Of course, the completion 10 may have more than one static mixer arranged at locations along the length thereof. Various forms of known static mixer are suitable for use with the invention. Suitable types, employing fixed flow deflecting baffles in a tube through which the mixture flows, are for example manufactured by Sulzer Brothers Limited, Winterthur, Switzerland. Other examples include static mixers manufactured by KENICS, (Chemineer, Inc), KOMAX ® and Plenty H & M Pty. Ltd.

The described arrangement has been advanced merely by way of explanation and many modifications may be made thereto without departing from the spirit and scope of the invention which includes every novel feature and combination of novel features herein disclosed.

I claim:

1. Apparatus for treating a mixture which contains at least oil and water components, the apparatus comprising a cyclone separator comprising elements, designed, sized and arranged for separating a more dense component of the mixture from a less dense component, said separator comprising an elongated separating chamber with a larger cross-sectional dimension end and a smaller cross-sectional dimension end, at least one feed inlet at said larger end and first and second outlet means, the apparatus further including means for facilitating the removal of globs of oil present in the mixture before the mixture enters the cyclone separator, said means comprising a static mixer device operatively connected to the separator and in the flow path of the mixture to be admitted to the separating chamber through said feed inlet, said static mixer device being effective to homogeneously mix the components of the mixture passing therethrough before admission to the separation chamber so as to facilitate removal of any globs of oil present in the mixture.

2. Apparatus according to claim 1 wherein said static mixer comprises a plurality of fixed baffles arranged to agitate and admix the liquid components.

3. Apparatus according to claim 1, further including means for delivering one or more fluid modifying agents to said mixture.

4. Apparatus for treating mixtures containing oil and water which are to be recovered from underground reservoirs, the apparatus including a duct or line disposed in a cavity between the reservoir and a surface thereabove and means for removing globs of oil present in the mixture, said means comprising at least one static mixer which is operatively connected to said duct or line and is effective to homogenously mix at least the oil/water components in the mixture which in use is delivered from the reservoir to the surface.

5. Apparatus according to claim 4 wherein there is provided a plurality of said static mixers spaced along the line so that the mixture maintains a substantially homogenous nature during delivery.

6. Apparatus for treating a mixture which contains at least oil and water components, the apparatus comprising a primary treatment section which includes one or more primary cyclone separators each cyclone separator comprising elements designed, sized and arranged for separating a more dense component of the mixture from a less dense component, each said separator comprising an elonaged separator chamber with a larger cross-sectional dimension end and a smaller cross-sectional dimension end each having inlet feed means and first and second outlet means, said primary cyclone separator(s) being of the type capable of handling a mixture containing a relatively high percentage of oil and of separating the mixture into first and second components which are discharged from said first and second outlet means respectively with said first component being relatively highly concentrated in oil and said second component being of relatively low concentration, the apparatus further including a second treatment section which includes one or more secondary cyclone separators comprising elements designed, sized and arranged for separating a more dense component of the mixture from a less dense component, said separator comprising an elongate separating chamber with a larger cross-sectional dimension end and a smaller cross-sectional dimension end, the or each separator including means operatively connected to said outlet means of said primary cyclone separator(s), said secondary cyclone separator(s) further including first and second outlet means and being of the type capable of handling mixtures containing a relatively low percentage of oil and of separating the mixture received from said outlet means of said primary cyclone separators into first and second components which is discharged from said first and second outlet means of said cyclone separators respectively, said first component containing substantially the remainder of the oil and said second component being substantially oil free, said apparatus further including means for facilitating removal of globs of oil present in the mixture said means comprising one or more static mixers either connected to the inlet of the or each of the separators of said primary treatment section and/or operatively connected to the line interconnecting the separators of the primary treatment section and those of the secondary treatment section.

* * * * *